United States Patent [19]
Crotty, III

[11] Patent Number: 5,857,728
[45] Date of Patent: Jan. 12, 1999

[54] MOUNTING BRACKET ASSEMBLY FOR A SUNSHADE AND METHOD OF INSTALLING THE SAME

[75] Inventor: Willard E. Crotty, III, Quincy, Mich.

[73] Assignee: Crotty Corporation, Quincy, Mich.

[21] Appl. No.: 716,063

[22] Filed: Sep. 19, 1996

Related U.S. Application Data

[63] Continuation-in-part of Ser. No. 553,109, Nov. 3, 1995, and a division of Ser. No. 350,409, Dec. 6, 1994, Pat. No. 5,499,854.

[51] Int. Cl.$^6$ ............................................. B60J 3/02
[52] U.S. Cl. ........................................ 296/97.9; 296/97.13
[58] Field of Search ............................ 296/97.9, 97.13

[56] References Cited

U.S. PATENT DOCUMENTS

3,017,217  1/1962  Keating ...................................... 296/97
4,756,570  7/1988  Cooper ...................................... 296/97 K Primary Examiner—Joseph D. Pape
Assistant Examiner—Clovia Hamilton
Attorney, Agent, or Firm—Baker & Daniels

[57] ABSTRACT

A sunshade mounting bracket assembly for mounting a sunshade to a vehicle without the use of tools or fasteners. The bracket assembly includes an outer bracket, an inner bracket, and an elbow to which the sunshade is attached. The outer bracket is mountable to an apertured panel such as the sheet metal interior roof of the vehicle. The inner bracket includes resilient locking prongs which define an interior cavity into which the elbow is inserted. The resilient locking prongs are structured to be insertable into an opening in the outer bracket. After their insertion into the outer bracket, the prongs engage the outer bracket when the inner bracket is axially rotated relative to the outer bracket from a first rotational orientation to a second rotational orientation for use. During their engagement with the outer bracket, the prongs are compressed radially inward and drawn axially into the outer bracket. The inner and outer brackets are secured against relative rotation when in the second rotational orientation by non-flexing locking ramps disposed on a one of the brackets which interfit with corresponding locking recesses located on the other bracket. The locking blocks are drawn into the locking recesses due to the camming action of the prongs. A method of installing the bracket assembly to a vehicle is also disclosed.

20 Claims, 6 Drawing Sheets

MOUNTING BRACKET ASSEMBLY FOR A SUNSHADE AND METHOD OF INSTALLING THE SAME

This is a Continuation-in-Part of U.S. application Ser. No. 08/553,109 filed on Nov. 3, 1995 which in turn is a Divisional Application of U.S. application Ser. No. 08/350,409 filed on Dec. 6, 1994 and which issued as U.S. Pat. No. 5,499,854 on Mar. 19, 1996.

BACKGROUND OF THE INVENTION

1. Field of the Invention

The present invention relates generally to sunshades for vehicles, and in particular, to a mounting bracket assembly that allows the sunshade to be installed in a vehicle without the use of tools or fasteners.

2. Description of the Related Art

Sunshades for vehicles are typically mounted on the vehicle body roof by a bracket assembly that provides both a horizontal axis about which a visor blade pivots between a storage position adjacent the vehicle headliner and a use position adjacent the windshield, and a generally vertical axis about which the visor pivots between a forward windshield position and a side window position. The need to use fasteners and tools, either powered or hand driven, in the installation into vehicles of many existing sunshade mounting bracket assemblies is undesirable for a number of reasons. For example, in addition to diminishing the aesthetics of the finished product, fasteners may be more labor intensive to install and therefore more expensive to employ. In addition to being costly, fasteners may also be potentially damaging to the vehicle.

A variety of sunshade mounting bracket assemblies have been developed, such as those disclosed in U.S. Pat. No. 5,062,608 and U.S. Pat. No. 5,242,204, which substantially dispense with the need for tools and fasteners in installation. However, while perhaps facilitating installation in some respects, these assemblies are not without their shortcomings.

For example, shortcomings with existing designs pertain to the effort or torque required to swing the sunshade between a windshield covering position and a side window covering position. The required rotational effort is typically a function of the frictional resistance between the bracket assembly elbow and the remainder of the mounting bracket assembly. Prior art attempts to control this effort have taken numerous forms. As disclosed in U.S. Pat. No. 5,242,204, springs have previously been used to try and force mating parts together to provide an adequate frictional engagement therebetween. However, the use of springs may increase the expense of the component parts and complicate the assembly of the parts.

Other designs, such as in U.S. Pat. No. 5,031,954, utilize an interference fit between an elbow or bracket arm and a bracket, wherein the elbow is held within the bracket by an engagement of an elbow head by tangs of the bracket.

In response to these shortcomings a visor mounting bracket assembly having a desired rotational effort that does not require springs to produce the effort and which can provide a substantial effort without hindering installation was developed and is disclosed by U.S. Pat. No. 5,499,854, which is expressly incorporated by reference herein. The visor mounting bracket assembly of U.S. Pat. No. 5,499,854 does not require fasteners or tools to install and provides a stable bracket assembly which is not likely to have its rotatability adversely affected by vibrations experienced during use. It is desirable to further improve the characteristics of this design.

SUMMARY OF THE INVENTION

The present invention provides an improved sunshade mounting assembly which can be readily and securely installed in a vehicle without the use of fasteners or tools.

The invention comprises, in one form thereof, a sunshade mounting assembly for mounting a sunshade to an apertured panel. The bracket includes an outer bracket, an inner bracket, and an elbow. The outer bracket is mountable to the apertured panel and includes a receiving opening for the inner bracket. The elbow is connectable with the sunshade. The inner bracket includes a plurality of resilient locking prongs defining an elbow receiving cavity. The prongs are also insertable into the receiving opening located on the outer bracket. The resilient locking prongs, after their insertion into the receiving opening, engage a portion of the outer bracket and are compressed radially inwardly when the inner bracket is axially rotated relative to the outer bracket from a first insertion orientation to a second installed orientation. The elbow, when disposed within the interior cavity during radial compression of the locking prongs, is compressed between the locking prongs such that rotation of the elbow relative to the inner bracket is frictionally resisted. When installed, the relative rotation of the inner and outer brackets is inhibited by an interfitting non-flexing locking ramp and locking recess; the locking ramp being disposed on one of the two brackets and the locking recess being disposed on the opposite bracket.

The invention comprises, in another form thereof, a modular headliner assembly and method of installation. The modular headliner assembly includes a vehicle headliner with an apertured backing plate to which a sunshade mounting assembly, similar to the assembly described above, is attached without the use of fasteners or tools. The modular headliner is subsequently installed in a vehicle as a single unit using the outer brackets of the sunshade mounting assembly to secure, in part, the modular headliner to the vehicle.

One advantage of the present invention is that a sunshade mounting bracket assembly can be securely installed, without tools or fasteners, in a convenient manner that will expedite assembly and avoid the disadvantages associated with the use of fasteners.

Another advantage of the present invention is that use of a non-flexing locking ramps and locking recesses simplifies the manufacture of the inner and outer mounting brackets thereby reducing costs.

Still another advantage of the present invention is that the mounting assembly enables the manufacture of a modular headliner assembly which includes attached sunshades. The modular headliner assembly can be manufactured separately from the vehicle and be installed in the vehicle as a single unit using the outer mounting bracket to secure, in part, the modular headliner to the vehicle. The use of such a modular headliner assembly permits greater flexibility in the procurement of the headliner assemblies by the automobile manufacturers.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Furthermore, although the terms upper, lower, vertical and horizontal and their functional equivalents are used in describing the illustrated embodiments of the invention, these terms are not meant to limit the orientation of the described components but are used instead to provide a more concise and readily understandable description of the disclosed embodiments.

Figure 1:
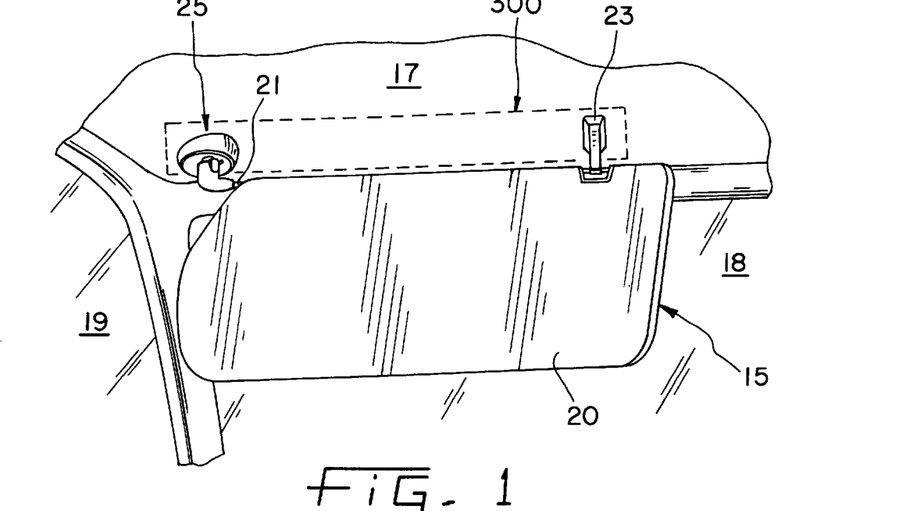
FIG. 1 is a perspective view of the present invention installed in a vehicle interior.

Referring now to FIG. 1, there is shown a visor mounting bracket assembly of the present invention, generally designated 25, employed to install a sunshade or visor, generally designated 15, to a hidden sheet metal panel which may be either an apertured backing plate 300 of limited width which placed behind the headliner and extends along the headliner 17 in a direction which is roughly parallel to the upper edge of the windshield 18 when the headliner and backing plate are installed in a vehicle or a larger sheet metal panel which defines the interior roof of the vehicle. The panel is covered by headliner 17 which may include, as is conventional, an exposed cushioned fabric material colored to complement the decor of the vehicle. Visor mounting bracket assembly 25 permits sunshade 15 to be horizontally pivoted about a vertical axis from the position shown in FIG. 1 proximate vehicle windshield 18 to a position proximate vehicle side window 19. As is conventional in the art, visor blade 20 is rotatably supported on generally horizontal visor shaft 21 extending from visor mounting bracket assembly 25, and can be coupled to support hook 23. The shown construction of the sunshade is not material to the present invention, as visor mounting bracket assembly 25 can be utilized with various styles of sunshades, including those with electrical circuitry for illuminated vanity mirrors furnished on the visor blade.

Figure 10:
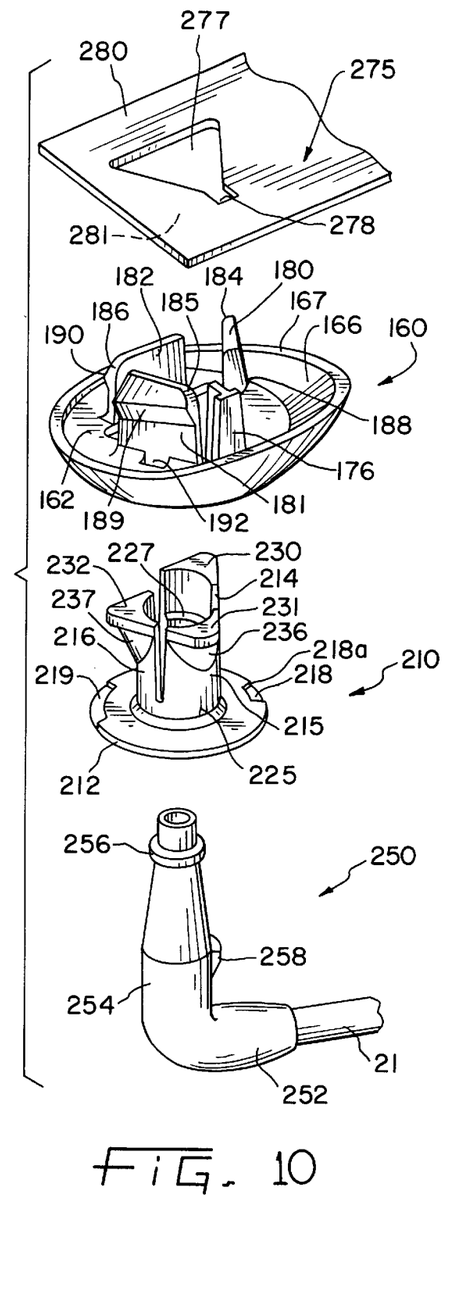
FIG. 10 is an exploded view of a mounting bracket assembly.

As shown in the embodiment illustrated in the substantially exploded view of FIG. 10, the visor mounting bracket assembly includes outer bracket member 160, inner bracket member 210, and elbow 250. The apertured panel 275 to which the assembly may be attached may be either a portion of the sheet metal roof or, in the case of off-line modular assembly, a rigid backing plate against which an interposed headliner is maintained. Panel 275 includes outer surface 280 and an inner surface 281. Panel 275 includes a keyed aperture formed by a generally triangular base aperture 277 and a rectangular slot 278 extending from base aperture 277. Slot 278 receives T-shaped anti-rotation pin or tower 176 and ensures a proper insertion alignment of outer bracket member 160 relative to apertured panel 275. The headliner intended to cover underside surface 281 of panel 275 is not separately shown in FIG. 10.

Referring now to FIGS. 7–10, outer bracket member 160 is integrally molded from a resilient plastic such as ABS or Acetal with a generally planar, circular bottom wall 162. A circular recess formed in the lower surface of bottom wall 162 is sized and shaped to accommodate bottom flange 212 of inner bracket member 210. Passing through the central portion of bottom wall 162 is keyed opening 164 through which the prongs of inner bracket member 210 insert. Keyed opening 164 allows inner bracket member 210 to be installed in only one orientation. Keyed opening 164 is generally triangular in shape but includes a non-symmetry to prevent an improper rotational orientation of inner bracket member 210 during its insertion. Alternatively, openings and cooperating inner bracket members having extending features to define a keyway and cooperating key member may also be employed.

Upwardly extending from the radial periphery of bottom wall 162 is outwardly bowed shield 166, which is shaped complementary to panel 275 such that shield upper edge 167 presses an interposed headliner against panel underside surface 281 when outer bracket member 160 is mounted. Anti-rotation pin 176 is also integrally formed with and upwardly extends from bottom wall 162.

Integrally formed into bottom wall 162 on the circular recess surface 169 are downwardly projecting locking blocks 170, 171. Outer bracket member 160 also includes three upwardly extending locking fingers which are resiliently hingedly connected to bottom wall 162. Locking fingers 180–182 are aligned in a one to one correspondence with, and flanking the legs of keyed opening 164. The resilient construction of fingers 180–182 affords sufficient resiliency to return from a radially inward deflected position experienced during bracket mounting to a radially outward latching position. The upper faces of locking fingers 180–182 include ramps 184–186 used for camming inner bracket member 210 upward into an assembled position. Locking bosses or catches 188–190 are integral with and project from the outwardly facing side surfaces of locking fingers 180–182 to positively engage or snap over the upper surface 280 of panel 275 during installation of outer bracket member 160. In order to positively engage alternately contoured panels or to engage alternatively shaped apertures, the locking fingers and locking bosses may be otherwise configured. Vertical slots 192 positioned in the radially outward base portions of locking fingers 180–182 extend downward through bottom wall 162 to the circular recess on the underside of bottom wall 162. Slots 192 are sized to allow insertion of a tool such as a screwdriver which may be used to individually force fingers 180–182 radially inward to allow removal of outer bracket member 160 from panel 275.

Rather than the integral formation shown, locking fingers 180–182 could alternatively be formed as part of an insert which is connectable to the remainder of outer mounting bracket 160. Suitable methods of connection may include a latching engagement as well as other ways well known in the art. This insert type construction is envisioned as advantageously providing the remainder of the shown mounting bracket assembly components with the flexibility to be employed with vehicles having differently configured headliners and the like. In particular, utilization of interchangeable inserts allows the angle and position at which locking fingers 180–182 are disposed relative to outer mounting bracket bottom wall 162 to be adjusted without requiring that differently constructed inner bracket members 210 or elbows 250 be furnished. As a result, by merely changing the insert containing the locking fingers, sunshade 15 may be disposed at different angles relative to outer mounting bracket 160, which may be desired as dictated by the shape of the vehicle to which mounting bracket assembly 25 is operationally installed.

Figure 2:
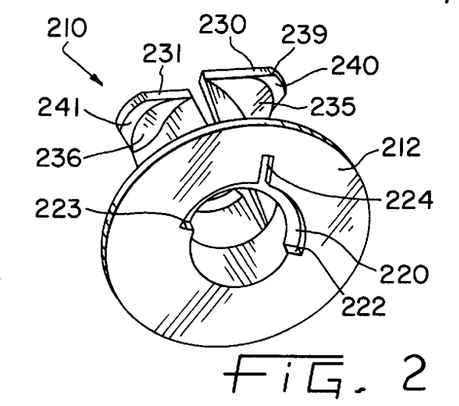
FIG. 2 is a perspective view of an inner mounting bracket.
Figure 3:
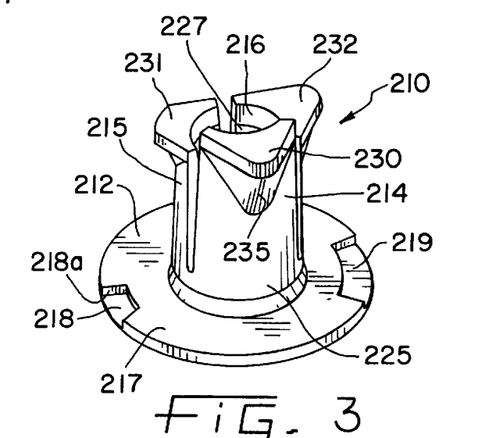
FIG. 3 is another perspective view of the inner mounting bracket of FIG. 2.
Figure 4:
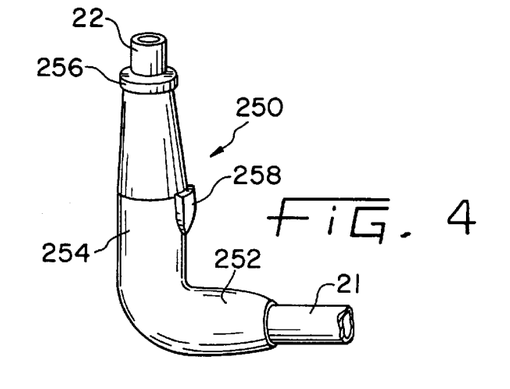
FIG. 4 is a perspective view of an elbow.
Figure 5:
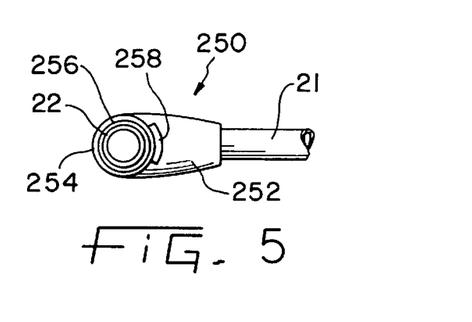
FIG. 5 is a plan view of an elbow.

Referring now to FIGS. 2, 3 and 10, inner bracket member 210 is molded from a resilient, flexible plastic such as Acetal that affords prongs 214–216 suitable flexibility to be compressed into a tightened engagement with elbow 250 during camming rotation of member 210 during assembly. Bottom annular flange 212 includes locking recesses 218, 219 disposed on the inner surface 217 of annular flange 212 and which cooperate with locking blocks 170, 171 respectively to lock inner bracket member 210 to outer bracket member 160. An arcuate groove 220 of around 180° formed in annular flange 212 flanks a central bore into which axially inserts elbow 250. Radially aligned end faces 222, 223 of arcuate groove 220 serve as stops for elbow stop tab 258 to provide the desired operational range of rotation for the elbow. Also present on the bottom surface of annular flange 212 is service slot 224 which permits the inner bracket member 210 to be engaged by a screwdriver during the disassembly of mounting bracket assembly 25 as described in greater detail below.

Tubular body 225 of inner bracket member 210 extends upwardly from flange 212 and terminates with upstanding prongs 214–216 defined by longitudinally extending slots therebetween. The hollow interior cavity of tubular body 225 is generally a frustoconical axial bore. The interior cavity tapers upwardly and, near the upper end of the cavity, a ledge 227 is disposed on and juts inwardly from each prong 214–216. Camming rims 230–232 are situated proximate the top of prongs 214–216 and protrude radially outward. Camming rims 230–232 have a common axial thickness but are not all located in the same axial plane since prong 214 is longer than prongs 215, 216. The camming rims 230–232 have an inner arcuate perimeter and together define an outer perimeter which is generally triangular with rounded corners and which is shaped for insertion through keyed opening 164. The corner defined by rim 231 is blunter than the corners defined by rims 230, 232 and matches a blunt corner in keyed opening 164 thereby preventing the inner bracket 210 from being inserted through key opening 164 in an incorrect orientation. Immediately below each of the camming rims 230–232 are camming throats 235–237 which also protrude radially outwardly. Rims 230–232 define a body upper periphery which is particularly shaped to insert through keyed opening 164. Camming throats 235–237 are generally rounded tetrahedral projections in shape and protrude radially outwardly. The camming throats 235–237 are integral with the camming rims 230–232 and extend from a lower surface thereof. The camming throats 235–237 are slightly spaced from the outer periphery of camming rims 230–232 defining lower rim surfaces 240–242 on the lower surface of camming rims 230–232 as can be seen most clearly in FIGS. 2 and 18.

As shown in FIGS. 4–6 and 10, elbow 250 is generally molded in an L-shaped form that includes a horizontal leg portion 252 and a vertical leg portion 254. Angles between leg portions 252 and 254 other than the approximately 90° angle shown may also be employed. At its upper end, elbow vertical leg portion 254 tapers upwardly to closely correspond in size and shape to the interior cavity of inner bracket member body 225. Annular ridge 256 is formed in vertical leg portion 254 near its top end. A radially extending stop block or tab 258 is formed along the middle region of vertical leg portion 254 at a height which results in tab 258 residing within arcuate slot 220 when annular ridge 256 is supported by inner bracket member ledges 227. A generally L-shaped visor shaft having a horizontal component 21 for supporting visor blade 20 and a vertical component 22 is encased within elbow 250. The illustrated shaft is a hollow tubular metal structure which would permit the routing of wires from the visor blade 20, for an accessory such as an illuminated vanity mirror, to the interior structure of the vehicle. The elbow is generally overmolded on the visor shaft in one piece from Nylon.

Figure 17:
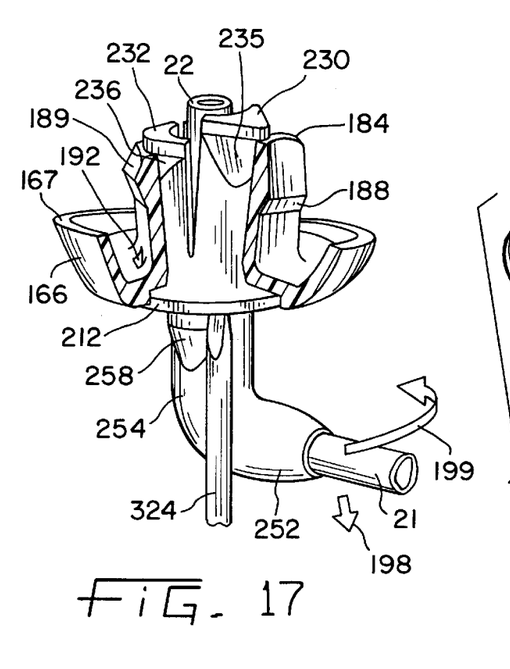
FIG. 17 is perspective and partially cross sectional view of a mounting bracket assembly being disassembled.
Figure 18:
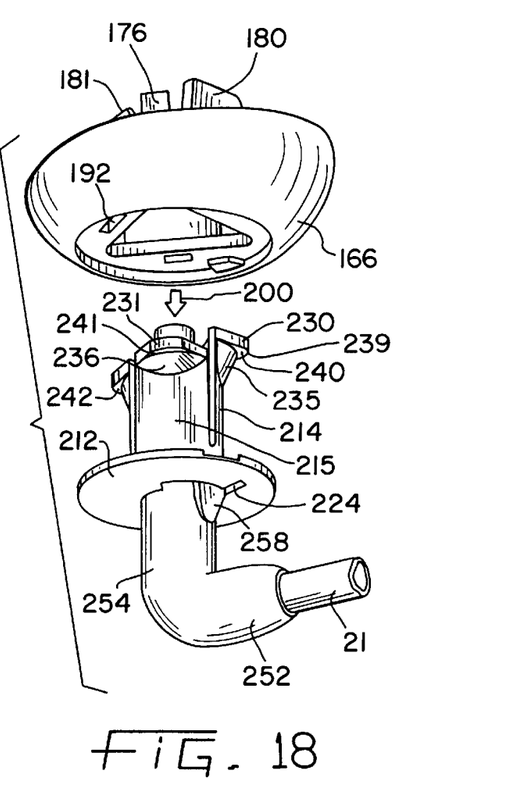
FIG. 18 is a perspective view of a mounting bracket assembly being disassembled.

The structure of the visor mounting bracket assembly of FIG. 10 will be further understood in view of the following description of a method of its installation, with reference to FIGS. 6 and 11–14, and its removal, with reference to FIGS. 17 and 18.

Figure 11:
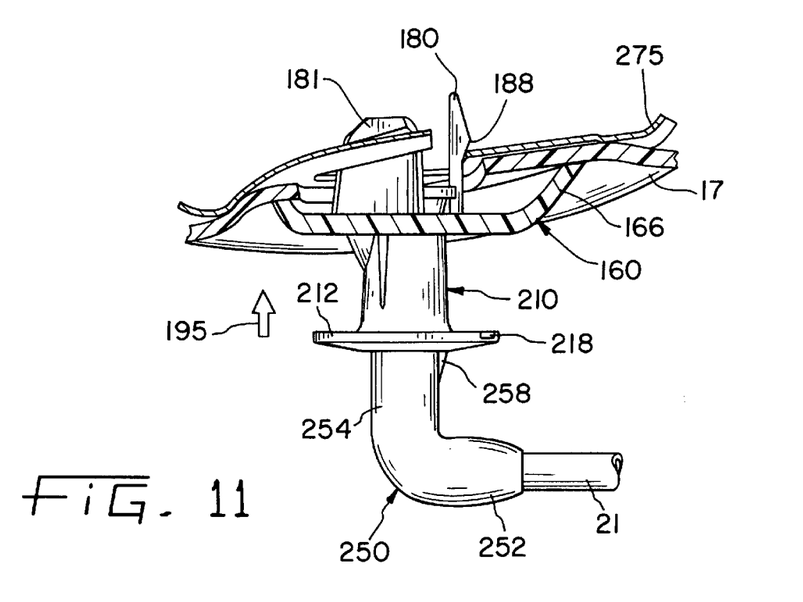
FIG. 11 is an elevational and partially cross-sectional view of an inner bracket and elbow being inserted into an outer bracket.
Figure 12:
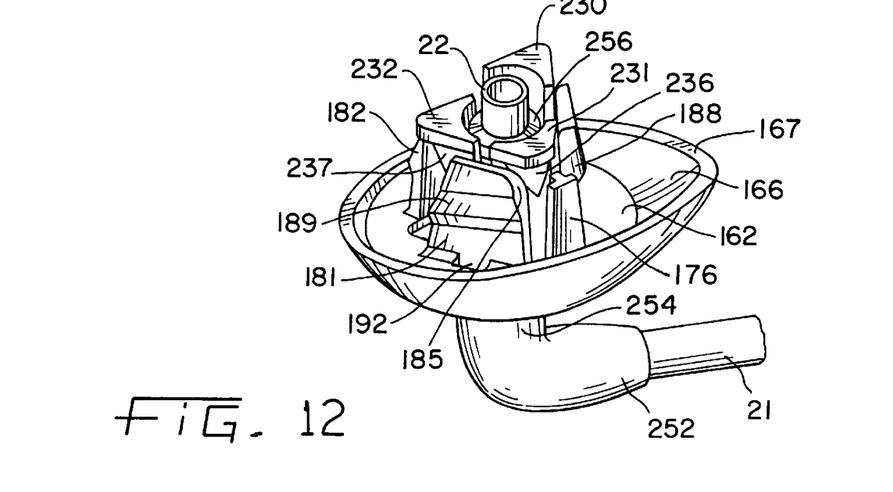
FIG. 12 is a perspective view of an installed mounting bracket assembly.

As shown in FIG. 11, before the inner bracket and elbow are inserted into the outer bracket 160 the outer bracket member 160 is initially attached to panel 275. Panel 275 is shown as the interior panel of a vehicle roof in FIG. 11. In particular, with outer bracket member 160 rotationally oriented such that anti-rotation tower 176 is aligned with rectangular slot 278 and such that locking fingers 180–182 are aligned with base aperture 277, outer bracket member 160 is moved upwardly in the direction indicated by arrow 195. During this upward insertion, the ramped upper faces of locking bosses 188–190 encounter the inner surface 281 of panel 275, which causes locking fingers 180–182 to be bent radially inward. As outer bracket member 160 continues to be forced upwardly, the tips of the locking bosses eventually pass outer surface 280 of panel 275, and locking fingers 180–182 then snap outwardly to a securing position latchably engaging panel 275.

Figure 6:
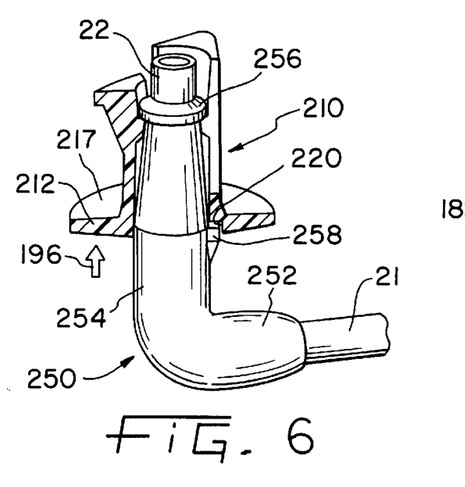
FIG. 6 is a perspective and partially cross-sectional view of the elbow and inner mounting bracket.
Figure 7:
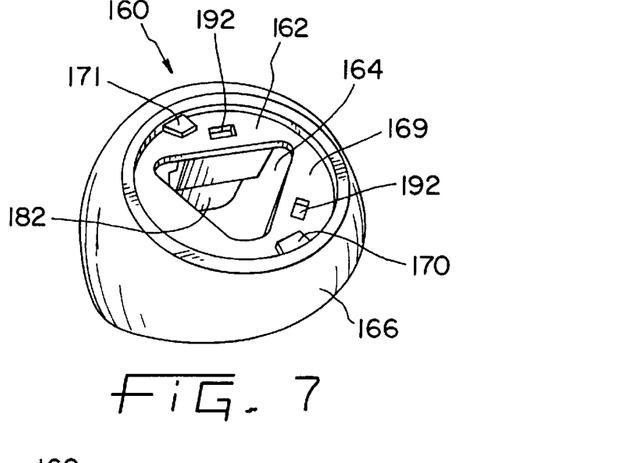
FIG. 7 is a perspective view of an outer mounting bracket.
Figure 8:
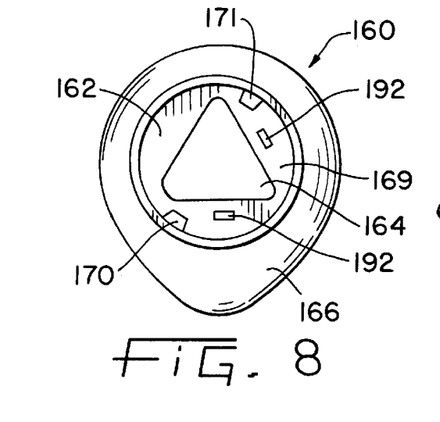
FIG. 8 is a plan view of the outer mounting bracket.

Referring now to FIGS. 6 and 11, after outer bracket member 160 is mounted, a subassembly of inner bracket member 210 and elbow 250 are installed. The subassembly of inner bracket member 210 and elbow 250 is shown in partial cross-section in FIG. 6 after the elbow 250 has been inserted into inner bracket member 210. The elbow 250 is inserted by aligning stop tab 258 with the arcuate groove 220 and inserting the elbow 250 into inner bracket member 220 in the direction of arrow 196. Elbow vertical leg portion 254 is slidably inserted in the axial direction into the interior cavity of body 225 until annular ridge 256 encounters ledges 227 of prongs 214–216. Provided sufficient axial force is applied to elbow 250, prongs 214–216 are biased outward allowing annular ridge 256 to slide past ledges 227, at which time prongs 214–216 resiliently snap back to their static position to effectively maintain elbow 250 therebetween. Elbow 250 may be rotated relative to inner bracket member 210 provided sufficient torque or effort is applied to overcome the frictional resistance that exists between elbow 250 and inner bracket 210 at the radial inward surface of ledges 227 and at the inner radial surface of the inner bracket member bore hole near annular flange 212. In the illustrated embodiment, stop tab 258 spans an arc of approximately 60°, thereby allowing elbow 250 to be rotated approximately 120°, i.e., the 180° arc of arcuate groove 220 minus the 60° arc spanned by stop tab 258. It will be appreciated that stop tab 258 and arcuate groove 220 cooperate to define the arcuate length of the visor travel path which is limited by the abutment of stop tab 258 with end faces 222, 223.

Insertion of the subassembly, see FIG. 11, commences by rotationally orienting inner bracket member 210 such that rims 230–232 are oriented so as to be insertable into keyed opening 164. The orientation of the subassembly may be aided by the integral molding of indicia such as arrows or other symbols on the components in a position where the indicia will not be visible after final assembly.

Figure 13:
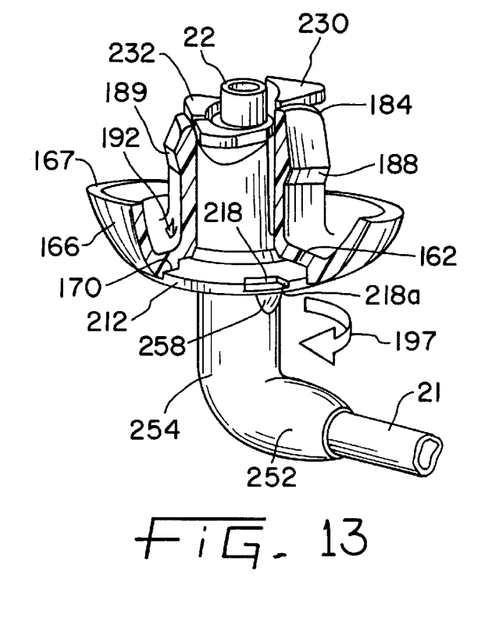
FIG. 13 is a perspective and partially cross-sectional view of a mounting bracket assembly.

By using a keyed triangular opening 164 and correspondingly shaped rims 230–232, the inner bracket member 210 will only be insertable into the outer bracket member 160 in the proper orientation. The subassembly is then slid in the axial direction indicated by arrow 195 until annular flange 212 enters the recess on the underside of bottom wall 162. During this insertion, locking blocks 170, 171 contact the upper face of flange 212 at points circumferentially spaced from, and disposed between, locking recesses 218, 219 as can be seen in FIG. 13. At this stage of installation, the subassembly is freely removable in an axial direction from within outer bracket member 160.

Figure 9:
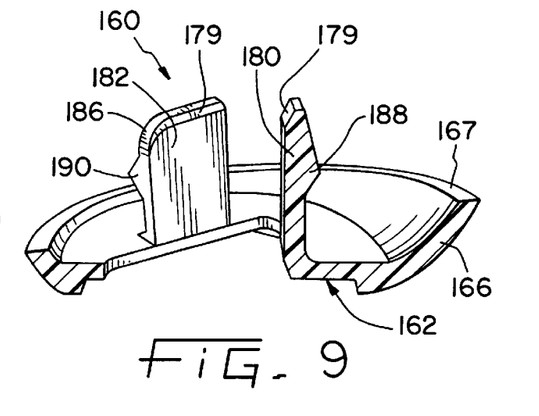
FIG. 9 is a perspective and cross-sectional view of the outer mounting bracket.
Figure 14:
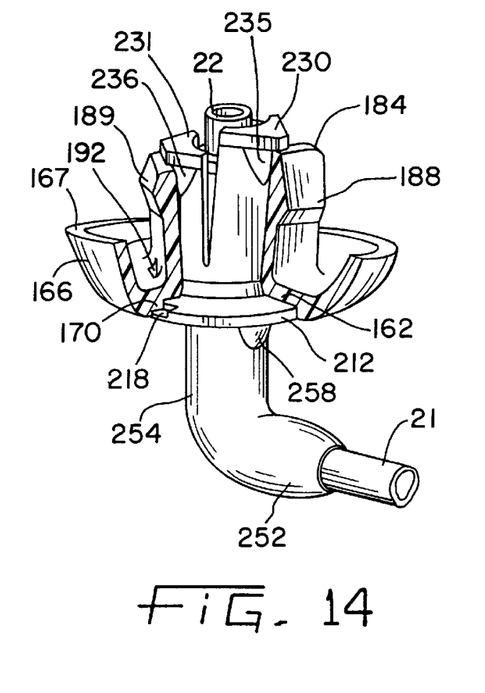
FIG. 14 is a perspective and partially cross-sectional view of a mounting bracket assembly.

Inner bracket member 210 is then releasably secured to outer bracket member 160, and thereby to panel 275, in a manner represented in FIGS. 13 and 14. As an installer rotates elbow 250 in the direction indicated by arrow 197, elbow 250 rotates relative to inner bracket member 210 until stop tab 258 abuts an arcuate slot end face of arcuate groove 220. Additional rotation of elbow 250 causes inner bracket member 210 to simultaneously rotate therewith and relative to outer bracket member 160, which is rotationally fixed by anti-rotation tower 176. During this rotation, camming rims 230–232 of body prongs 214–216 ramp up camming ramps 184–186 of locking fingers 180–182, drawing inner bracket member 210 slightly upward as it is rotated from the position shown in FIG. 13 to the position shown in FIG. 14. During this further rotation, radially outward extending camming throats 235–237 below camming rims 230–232 encounter locking fingers 180–182. The locking fingers 180–182 may have inwardly slanted surfaces 179 as shown in FIG. 9 to aid in this camming action. Surfaces 179 typically initially engage the radially outer perimeter surface of rims 230–232 during the ramping up of the prongs and after the prongs have reached an installed position surfaces 179 may engage either one of the camming throats or a corner 239 (FIG. 18) between the lower surface of the camming rim and the radially outer perimeter surface of the rim. Due to their resilient character, prongs 214–216 are compressed radially inward during camming, and locking fingers 180–182 may also experience a slight radially outward bending further securing the entire assembly 25 to panel 125. As prongs 180–182 are pressed inwardly, their inner surfaces compress vertical leg 254 and annular ridge 256 of elbow 250, thereby providing a force transverse to the axis about which elbow 250 is inserted and rotated. This compressing force translates to an increased frictional force or rotational effort for the mounting bracket assembly. It will be appreciated that when elbow 250 is axially inserted vertically into the mounting bracket, the forces on the elbow creating the higher frictional effort are horizontally oriented. By altering the size of camming rims 230–232 and camming throats 235–237 the rotational effort required to swing the visor from adjacent the windshield to adjacent the side window can be adjusted. In other words, the camming throats and rims can be increased or decreased in size to regulate the frictional force between the inner bracket and elbow.

Inner bracket member 210 continues to rotate with elbow 250 until locking recesses 218, 219 are aligned with locking blocks 170, 171. As mentioned above, rotation of the inner bracket member 210 relative to the outer bracket member 160 causes the inner bracket member to be drawn further into the outer bracket member 160 and brings the upper surface of annular flange 212 into contact with the bottom surface 169 of the circular recess in wall 162. The presence of locking blocks 170, 171 prevents the contact between the annular flange 212 and circular recess surface 169 from being entirely flush prior to the seating of locking blocks 170, 171 within the locking recesses 218, 219. There exists sufficient resiliency in the locking fingers 180–182, prongs 214–216, bottom wall 162 and annular flange 212 to permit the camming rims 230–232 to ramp up camming ramps 184–186 prior to the seating of locking blocks 170, 171 within the locking recesses 218, 219. The locking recess 219 is arcuately longer than the locking block 171 and, thus, the locking block 171 is seated within locking recess 219 shortly after the camming rims 230–232 are ramped up the camming ramps 184–186. As the inner bracket member 210 is rotated further relative to outer bracket member 160, locking block 171 is slid within locking recess 219 until locking block 171 reaches a radial side wall of the locking recess 219. Locking block 170 is simultaneously slid arcuately along the circular recess towards locking recess 218 and snaps into recess 218 as the locking block 171 reaches the radial end wall of locking recess 219. The axial tensile forces which snap locking block 170 into recess 218 are created when camming rims 230–232 are ramped up locking fingers 180–182. Locking block 170 and locking recess 218 have similar configurations so that when locking block 170 snaps into locking recess 218 the inner bracket member 210 cannot be rotated relative to the outer bracket member 160 in either rotational direction due to the abutment of locking block 170 with the radially oriented side walls 218a of locking recess 218. Locking block 171 resists relative rotational movement of the inner and outer bracket members only in the rotational direction of arrow 197 since the locking block 171 abuts only one of the radial side walls of locking recess 219 when locking block 170 has been seated within locking recess 218 and the inner bracket member 210 has reached its installed position. The visor mounting bracket assembly is in its operational position once it has reached this installed position. Also envisioned are alternative embodiments in which recess 219 has the same configuration as block 171 and blocks 170, 171 simultaneously snap into their respective recesses 218, 219. Other possible alternatives include the use of a single locking block and locking recess, the placement of the locking blocks on the inner bracket member with cooperating locking recesses on the outer bracket member as well as alternatively shaped locking blocks and recesses. These alternative versions of locking blocks and recesses would operate in a similar manner wherein the axial tension created by the camming action between the locking prongs and locking fingers would engage the locking blocks and recesses after the inner bracket assembly had been rotated sufficiently to engage the locking blocks and recesses and the engagement of the locking blocks with the locking recesses would inhibit relative rotation of the inner and outer bracket members.

Referring now to FIGS. 17 and 18, removal of the visor mounting bracket assembly begins by first axially displacing the elbow 250 and inner bracket member 210 relative to the outer bracket member 160 by pulling downward on the elbow or horizontal shaft 21 in the direction of arrow 198. The axially downward motion disengages locking block 170 from locking recess 218 and permits the inner bracket 210 to be rotated in the direction of arrow 199 relative to outer bracket 160. The rotation may be accomplished by turning elbow 250 which causes stop tab 258 to engage end face 222 and causes inner bracket member 210 to rotate with elbow 250, alternatively, a tool such as screwdriver 324 may be inserted in service slot 224 to rotate inner bracket 210 as shown in FIG. 17 when rotation of the visor is inhibited due to the presence of a windshield. After inner bracket member 210 rotates through a preselected angular arc, camming rims 230–232 will again be properly oriented with keyed opening 164 to allow withdrawal in axial direction 200 of the inner bracket member/elbow subassembly as shown in FIG. 18. The inner bracket 210 will require an additional downward pull to disengage locking block 171 from locking recess 219 as the inner bracket is rotated and locking block 171 engages a radial side wall of locking recess 219. The outer mounting bracket 160 can then be removed from the apertured panel by inserting a tool such as a flathead screwdriver through slots 192 to bias the locking finger associated with the slot 192 radially inward and thereby disengage the locking finger from the apertured panel.

Figure 15:
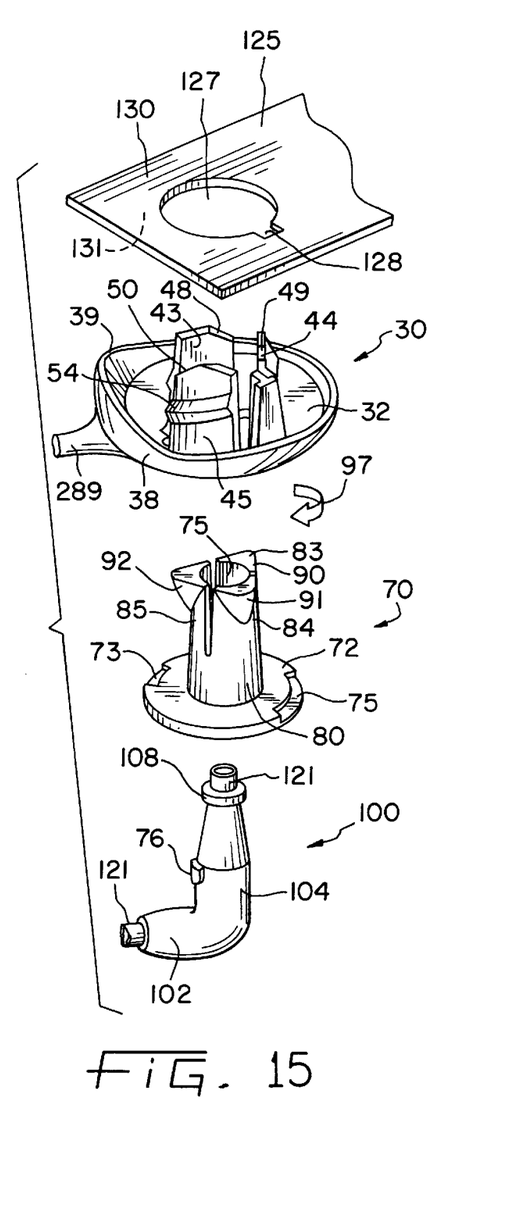
FIG. 15 is an exploded view of a second embodiment of a mounting bracket assembly.
Figure 16:
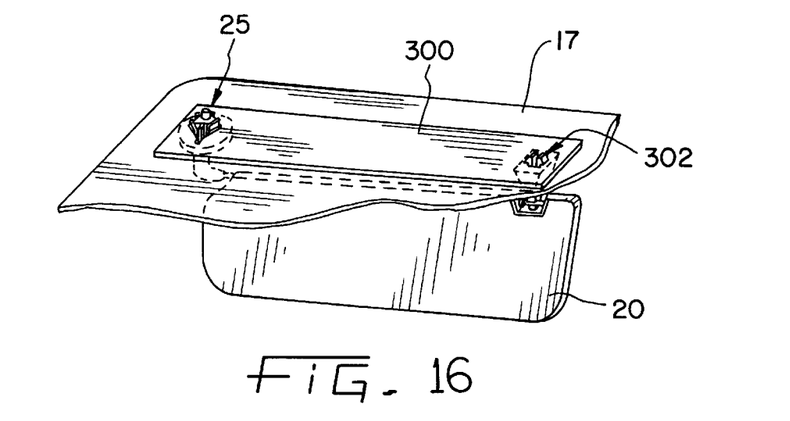
FIG. 16 is a partial perspective view of a modular headliner.

A second embodiment of the invention is shown in FIG. 15 and is in many respects similar to the embodiment of FIG. 10. Referring to the substantially exploded view of FIG. 15, the second embodiment of the visor mounting bracket assembly basically includes an outer bracket member 30, an inner bracket member 70, and an elbow 100. The visor mounting bracket assembly is installed to an apertured panel 125 including an outer surface 130 and an inner surface 131. Panel 125 includes a keyed aperture 127, which in this embodiment is shaped as a circle with an extending keyway 128 for purposes of ensuring a proper insertion alignment of outer bracket member 30. Panel 125 represents a rigid backing panel. While the headliner 17 covering underside surface 131 of panel 125 is not shown in FIG. 15, headliner 17 is pressed between outer bracket member 30 and panel 125 when outer bracket member 30 is installed. The rigid backing panel 125 and outer bracket would loosely hold the headliner therebetween until a later stage of assembly when the outer bracket would also be attached to an appropriately apertured sheet metal roof, thereby compressing the back plate and headliner tightly therebetween. As can be seen in FIG. 16, mounting bracket assembly 25 has been secured to backing plate 300 and secures headliner 17 therebetween. Visor support 302, which has resilient aperture engaging fingers, secures the headliner to the opposite end of rigid backing plate 300.

Outer bracket member 30 is preferably molded in one-piece from a suitable plastic material such as ABS or Acetal. Outer bracket member 30 includes a generally planar circular recess on the lower surface of bottom wall 32 which is shaped to accommodate bottom flange 72 of inner bracket member 70. Centrally disposed within the circular recess is a keyed opening through which inner bracket member 70 inserts. In the shown embodiment, keyed opening is generally triangular in shape with one of the triangle corners shortened to prevent inner bracket member 70 from being inserted at an improper rotational orientation.

Upwardly extending from the radial periphery of bottom wall 32 is shield 38, which is bowed outwardly. Radially aligned ribs between the sides of shield 38 and bottom wall 32 may be provided to increase the bracket member rigidity without introducing significant extra material costs or weight. Shield 38 is particularly shaped in conjunction with the headliner 17 or vehicle roof panel to which the visor mounting bracket assembly is installed such that around its entire circumference shield upper edge 39 is flush with headliner 17 when outer bracket member 30 is mounted.

Outer bracket member 30 also includes a set of three upwardly extending locking fingers which are resiliently hingedly connected to bottom wall 32. Locking fingers 43–45 are aligned in a one to one correspondence with, and flanking the three legs of, the triangular keyed opening. In the integral configuration shown, the plastic construction of fingers 43–45 furnishes them with sufficient resiliency to return from a radially inward deflected position during insertion of the outer bracket 30 into aperture 127 to a latching position after the locking bosses 54 have been inserted through aperture 127.

The upper faces of locking fingers 43–45 each includes ramps 48–50 used for camming inner bracket member 70 upward into an assembled position. Locking bosses 54 are integral with and project from the outwardly facing side surfaces of locking fingers 43–45 to positively engage the upper face of sheet metal panel 125 during installation of outer bracket member 30. To account for angling of panel 125 relative to the visor mounting bracket assembly, locking bosses 54 may be oriented at an angle on the locking fingers and have an outer periphery which is adapted to cooperate with the configuration of aperture 127. In the embodiment shown in FIG. 15, the locking bosses have an arcuate outer periphery with a radius which is slightly larger than that of circular aperture 127.

As described with reference to the embodiment of FIG. 10, locking fingers 43–45 could alternatively be formed as part of an insert which is connectable to the remainder of outer mounting bracket 30.

Formed integrally with the shield 38 of the outer bracket member 30 is an auxiliary visor arm 289 which extends parallel to the front windshield when the bracket assembly is installed. An auxiliary visor blade (not shown) may be attached to visor arm 289 and may be rotated down to cover the top portion of the windshield when the primary visor blade has been swung to cover the side window.

Inner bracket member 70 is preferably molded in one-piece from a resilient, flexible material such as Acetal plastic. This construction affords prongs 83–85 suitable flexibility to be compressed into a tightened engagement with elbow 100 during assembly. Inner bracket member 72 has an axial bore 75 located therethrough which receives elbow 100. Bottom annular flange 72 includes locking recesses 73, 74 which cooperate with locking blocks, not shown, on the outer mounting bracket 30 in the same manner as described for the embodiment of FIG. 10.

Tubular body 80 of inner bracket member 70 extends upwardly from flange 72 and terminates with upstanding prongs 83–85 defined by longitudinally extending slots therebetween. The interior cavity of tubular body 80 forms the upper volume of axial bore 75 and is generally frusto-conical in shape. The interior cavity tapers upwardly and, near the upper end of the cavity, a ledge is disposed on and juts inwardly from each prong 83–85. Camming lugs 90–92 situated proximate the top of prongs 83–85 are generally rounded tetrahedral projections in shape and protrude radially outwardly. Camming lugs 90–92 can be increased or decreased in size to achieve proper rotational effort of visor swing torque. In other words, the camming lugs can be increased or decreased in size to regulate the frictional force between the inner bracket and elbow. Lugs 90–92 together define a body upper periphery which is generally triangular in outlined shape. In order for prongs 90–92 to be insertably received through the keyed opening in the outer mounting bracket 30 which includes a shortened corner similar to opening 164, lug 91 lacks an outermost tip present in lugs 90 and 92.

Elbow 100 is generally molded in one piece from Nylon in an L-shape form that includes a horizontal leg portion 102 and a vertical leg portion 104. The approximately 90° bend shown is merely exemplary, as other angles may be employed in some situations to properly locate sunshades in their respective vehicles. Elbow vertical leg portion 104 tapers upwardly in size and shape and generally corresponds to the interior cavity of inner bracket member body 80. Elbow vertical leg portion 104 is integrally formed with a radially extending stop tab 76 at its lower end and an annular ridge 108 at its top end. In the shown embodiment, the visor shaft 121 is also L-shaped and encased within both leg portions 102 and 104. Visor shaft 121 reinforces the plastic construction of elbow 100 and may serve as a conduit through which electrical current to potential visor accessories is circuited.

Figure 19:
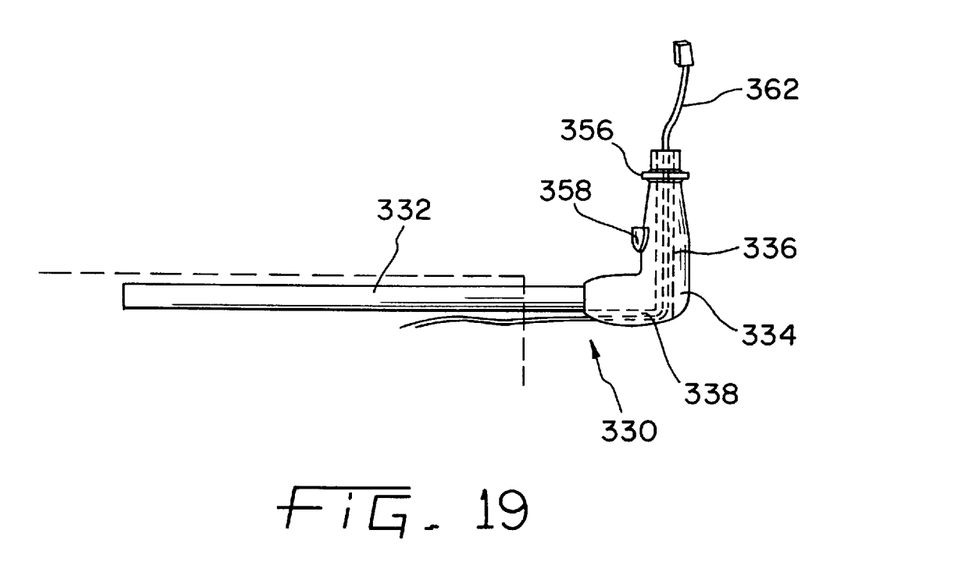
FIG. 19 is an elevational view of an integral plastic visor support shaft and elbow.
Figure 20:
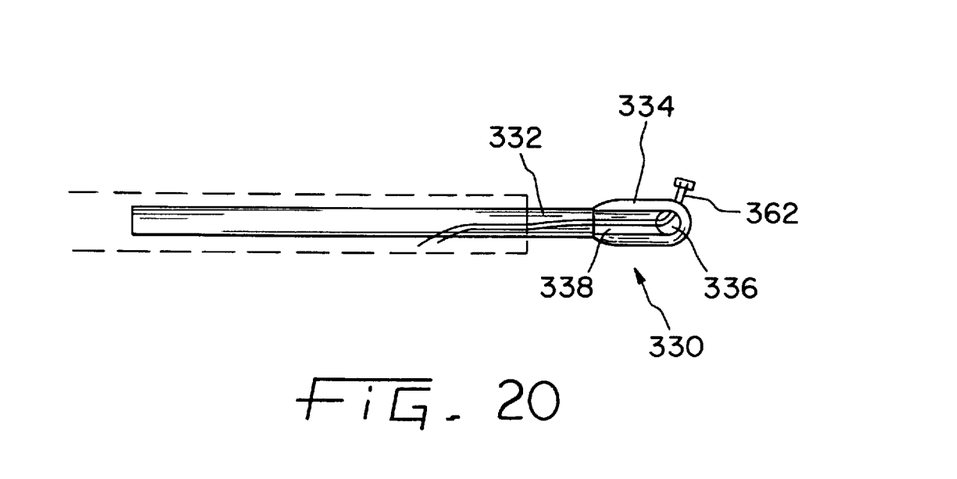
FIG. 20 is a bottom view of the integral visor support shaft and elbow of FIG. 19.

It is also possible to use a one piece nylon plastic component 330 comprised of a solid visor support rod 332 and an elbow 334 which is formed integrally with the rod 332 and which permits the routing of electrical wiring 362 to the interior of a sun visor assembly. As seen in FIGS. 19 and 20, elbow 334 has a generally vertical portion having a bore hole 336 through which electrical wiring 362 may be routed to the interior of the vehicle. A groove 338 is located on the bottom of the generally horizontal portion of the elbow 334 for concealing electrical wiring 362. The wiring is then routed alongside a short length of the solid support rod 332 until it is enclosed by the outer covering of the visor blade, partially shown in dashed outline in FIGS. 19 and 20. Elbow 330 also includes an annular ridge 356 and a stop tab 358 which function in a manner similar to annular ridges 108, 256 and stop tabs 76, 258 respectively.

To connect elbow 100 to inner bracket member 70, elbow vertical leg portion 104 slidably inserts in an axial direction through bore 75 and into the interior cavity of body 80 until annular ridge 108 encounters the radially inwardly directed ledges of prongs 83–85. Provided sufficient axial force is applied to elbow 100, prongs 83–85 are biased outwardly allowing annular ridge 108 to slide past the ledges, at which time prongs 83–85 resiliently snap back to their static position to effectively maintain elbow 100 therein. Elbow 100 is free to rotate about its axis of insertion relative to inner bracket member 70 provided torque or effort sufficient to overcome a first frictional resistance is applied. When so connected, stop tab 76 is elevationally aligned with an arcuate travel groove in the bottom of flange 72. The interaction of the arcuate travel groove and stop tab 76 define the arcuate length of the visor travel path as described above with reference to the embodiment of FIG. 10.

The mounting assembly may be either attached to a modular headliner for subsequent incorporation into a vehicle or it may be directly mounted to a vehicle roof with a headliner therebetween. Moreover, the various components of assembly 25 can be installed at various points of manufacture, as mounting bracket 30 can be used to fasten headliner 17 to panel 125 while the remainder of the assembly components can be subsequently installed to the vehicle panel at a later stage of manufacture if desired. It will be appreciated that the present inventive assembly may advantageously serve as part of the fastening system for the headliner.

The embodiment shown in FIG. 15 is assembled in a manner similar to that described for the embodiment of FIG. 10, however, the embodiment of FIG. 15 is adapted for placement adjacent the windshield on the passenger side (for a U.S. vehicle) while the embodiment of FIG. 10 is adapted for placement on the driver side of the vehicle. As can be appreciated by the location of camming ramps 48–50, the rotation of inner bracket member 70 relative to outer bracket member 30 will be in the direction of arrow 97 during assembly.

The use of mounting bracket assemblies with a modular headliner is illustrated in FIG. 16. Both the outer bracket member of mounting bracket assembly 25 and the visor support 302 have resilient locking fingers which respectively and loosely secure the bracket assembly and visor support member to apertured backing plate 300 with the headliner 17 therebetween. Tinnerman clips may also be used to secure the apertured backing plate 300 to the headliner 17 prior to insertion of the locking fingers of the outer bracket member through the headliner 17 and apertured backing plate 300. At a later stage of assembly the locking fingers of the outer bracket and visor support would be inserted into apertures in a sheet metal roof of a vehicle, thereby tightly securing the back plate and headliner between the roof and the outer mounting bracket and the visor support respectively. Although backing plate 300 is shown as extending only from the driver side mounting assembly 25 to the driver side visor support 302, the backing plate could also extend from the driver side mounting assembly 25 to a passenger side mounting assembly and have apertures adapted for engagement with both mounting assemblies and both visor supports or have an aperture for engaging only the locking fingers of the outer mounting bracket. Using backing plate 300 allows the entire mounting assembly to be attached to the headliner prior to placement of the headliner 17 within the vehicle. Alternatively, backing plate 300 can be attached to headliner 17 with only the outer bracket member and visor support 302 and the inner bracket member, elbow and visor blade can be installed after the headliner has been attached to the vehicle roof. The locking fingers of the outer bracket member and of the visor support may be used to partially secure the headliner to the vehicle roof by inserting the locking fingers into apertures in the vehicle roof to thereby sandwich both the headliner 17 and the backing plate 300 between the vehicle roof panel and the outer bracket member and the visor support. The use of backing plate 300 provides increased manufacturing flexibility by permitting the attachment of the headliner and visor assemblies at one location and the subsequent installation of the headliner in the vehicle at a second location.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A mounting bracket assembly for mounting a visor to an apertured panel comprising:

an elbow which is connectable to a said visor;

an outer bracket mountable to the apertured panel and including a first surface, said first surface including an inner bracket receiving opening, said inner bracket receiving opening having an axis and a first locking means disposed on said first surface, said first locking means having a substantially fixed position relative to said first surface; and an inner bracket having a second surface, a second locking means disposed on said second surface, said second locking means having a substantially fixed position relative to said second surface, and a resilient locking prong defining at least a portion of a cavity, said elbow disposed in said cavity, said resilient locking prong insertable into said inner bracket receiving opening in an insertion orientation, said inner bracket having an installed orientation wherein said second surface is disposed generally parallel to and adjacent said first surface, said locking prong including cam means for engaging with a portion of said outer bracket and for biasing said second surface against said first surface when said inner bracket is rotated around said axis relative to said outer bracket from said insertion orientation to said installed orientation, said first locking means engaging said second locking means when said inner bracket is rotated relative to said outer bracket to said installed orientation to thereby inhibit relative rotation between said inner bracket and said outer bracket.

2. The mounting bracket assembly of claim 1 wherein said first and second locking means are an integral portion of said outer and inner brackets respectively.

3. The mounting bracket assembly of claim 1 wherein said cam means axially biases said inner bracket relative to said outer bracket and said first and second surfaces are disposed generally transverse to said opening axis in said installed orientation.

4. The mounting bracket assembly of claim 1 wherein one of said first and second locking means comprises a non-flexing locking block and the other said locking means comprises a locking recess which interfits with said locking block.

5. The mounting bracket assembly of claim 1 wherein said inner bracket further comprises an annular flange surrounding said cavity, said prong extending from a first flange side, said second surface being disposed on said first flange side radially outwardly of said prong and generally transverse to said prong;

said first surface defining a recessed circular area on said outer mounting bracket for receiving said annular flange.

6. The mounting bracket assembly of claim 5 wherein one of said first and second locking means comprises a non-flexing locking block and the other said locking means comprises a locking recess which interfits with said locking block.

7. The mounting bracket assembly of claim 6 wherein said locking recess is disposed adjacent an outer perimeter of said annular flange.

8. The mounting bracket assembly of claim 6 wherein said locking recess is an arcuate recess.

9. The mounting bracket assembly of claim 6 wherein said annular flange further comprises an arcuate travel recess in a second flange side opposite said first flange side, said recess adjacent said cavity and said elbow further comprises a stop tab disposed within said travel recess.

10. The mounting bracket assembly of claim 6 wherein said annular flange further comprises a service slot on a second flange side opposite said first flange side whereby said slot may be engaged with a tool to rotate said inner bracket relative to said outer bracket.

11. The mounting bracket assembly of claim 6 wherein said locking prong is one of a plurality of locking prongs defining said portion of a cavity, each of said locking prongs insertable into said inner bracket receiving opening in said insertion orientation having said cam means for engaging with said portion of said outer mounting bracket and for biasing said second surface against said first surface when said inner bracket is rotated from said insertion orientation to said installed orientation.

12. The mounting bracket assembly of claim 1 wherein said outer bracket includes resilient locking fingers for engaging the apertured panel and said assembly further comprises a headliner disposed between the apertured panel and said outer bracket.

13. The mounting bracket assembly of claim 12 further comprising a rigid backing plate disposed between the apertured panel and said headliner, said resilient locking fingers extending through an aperture in said backing plate.

14. A mounting bracket assembly for mounting a visor to an apertured panel comprising:

an elbow connectable to the visor;

an outer bracket mountable to the apertured panel and including an inner bracket receiving opening with an axis, a first surface, and a first locking means disposed on said first surface, said first locking means having a substantially fixed position relative to said first surface; and an inner bracket having a second surface, a second locking means disposed on said second surface, said second locking means having a substantially fixed position relative to said second surface, and a plurality of resilient locking prongs defining at least a portion of a cavity, said elbow disposed in said cavity, said resilient locking prongs insertable into said inner bracket receiving opening in an insertion orientation, said inner bracket having an installed orientation wherein said second surface is disposed generally parallel and adjacent said first surface, said locking prong including cam means for engaging with a portion of said outer bracket and for biasing said second surface against said first surface and radially inwardly biasing said locking prongs against said elbow when said inner bracket is axially rotated relative to said outer bracket from said insertion orientation to said installed orientation, said first locking means engaging said second locking means when said inner bracket is rotated relative to said outer bracket to said installed orientation to thereby inhibit relative rotation between said inner bracket and said outer bracket.

15. The mounting assembly of claim 14 wherein one of said first and second locking means comprises a non-flexing locking block and the other said locking means comprises an interfitting locking recess.

16. The mounting bracket assembly of claim 15 wherein said inner bracket further comprises an annular flange surrounding said cavity, said plurality of prongs extending from a first flange side, said second surface being disposed on said first flange side radially outwardly of said prongs and generally transverse to said prongs;

said first surface defining a recessed circular area on said outer mounting bracket for receiving said annular flange.

17. A method of installing a visor in an apertured panel comprising:

mounting an outer bracket in the aperture of the panel, said outer bracket having an inner bracket receiving opening with an axis, a first surface, and a first locking means disposed on said first surface, said first locking means having a substantially fixed position relative to said first surface;

providing an inner bracket member having a second surface, a second locking means disposed on said second surface, said second locking means having a substantially fixed position relative to said second surface, and a resilient locking prong defining at least a portion of a cavity;

inserting an elbow connectable to the visor into said cavity of said inner bracket;

inserting said locking prong of said inner bracket into said inner bracket receiving opening in an insertion orientation;

axially rotating said inner bracket relative to said outer bracket to an installed orientation wherein said second surface is disposed generally parallel and adjacent said first surface, said locking prong including cam means which engage with a portion of said outer bracket and bias said second surface against said first surface when said inner bracket is axially rotated relative to said outer bracket from said insertion orientation to said installed orientation whereby said first locking means engage said second locking means when said inner bracket is rotated relative to said outer bracket to said installed orientation and thereby inhibit relative rotation between said inner bracket and said outer bracket.

18. The method of claim 17 wherein said cam means axially biases said inner bracket relative to said outer bracket and said first and second surfaces are disposed generally transverse to said opening axis in said installed orientation.

19. The method of claim 17 wherein one of said first and second locking means comprises a non-flexing locking block and the other said locking means comprises a locking recess which interfits with said locking block.

20. The mounting bracket assembly of claim 19 wherein said inner bracket further comprises an annular flange surrounding said cavity, said plurality of prongs extending from a first flange side, said second surface being disposed on said first flange side radially outwardly of said prongs and generally transverse to said prongs;

said first surface defining a recessed circular area on said outer mounting bracket for receiving said annular flange.

\* \* \* \* \*